(12) United States Patent
Chen et al.

(10) Patent No.: US 8,854,956 B2
(45) Date of Patent: Oct. 7, 2014

(54) SYSTEM AND METHOD FOR FINDING SEGMENTS OF PATH FOR LABEL SWITCHED PATH CROSSING MULTIPLE DOMAINS

(75) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/195,920

(22) Filed: Aug. 2, 2011

(65) Prior Publication Data
US 2013/0034103 A1 Feb. 7, 2013

(51) Int. Cl.
- *H04J 1/16* (2006.01)
- *H04L 12/715* (2013.01)
- *H04L 12/721* (2013.01)
- *H04L 12/723* (2013.01)
- *H04L 12/28* (2006.01)
- *H04L 12/56* (2006.01)
- *H04L 12/717* (2013.01)

(52) U.S. Cl.
CPC ............... *H04L 45/124* (2013.01); *H04L 45/42* (2013.01); *H04L 45/04* (2013.01); *H04L 45/50* (2013.01)
USPC .......................... 370/229; 370/351; 370/395.5

(58) Field of Classification Search
USPC ......................... 370/229–235, 351–353, 395.5
See application file for complete search history.

(56) References Cited

U.S. PATENT DOCUMENTS

| | | | | |
|---|---|---|---|---|
| 6,321,271 | B1 * | 11/2001 | Kodialam et al. | 709/241 |
| 2006/0039391 | A1 * | 2/2006 | Vasseur et al. | 370/409 |
| 2008/0084890 | A1 * | 4/2008 | Kompella | 370/400 |
| 2009/0316583 | A1 | 12/2009 | Li et al. | |

OTHER PUBLICATIONS

Zhao, Q., et. al., "PCE-Based Computation Procedure to Compute Shortest Constrained P2MP Inter-Domain Traffic Engineering Label Switched Paths," draft-zhao-pce-pcep-inter-domain-p2mp-procedures-06.txt, Oct. 25, 2010, 20 pages.
Vasseur, J., et. al., "Path Communication Element (PCE) Communication Protocol," RFC 5440, Mar. 2009, 88 pages.
Vasseur, J., et. al., "A Backward-Recursive PCE-Based Computation (BRPC) Procedure to Compute Shortest Constrained Inter-Domain Traffic Engineering Label Switched Paths," RFC 5441, Apr. 2009, 19 pages.
Liu, et al., "A *Prune: An Algorithm for Finding K Shortest Paths Subject to Multiple Constraints", Twentieth Annual Joint Conference of the IEEE Computer and Communications Societies, vol. 2, Anchorage, AK, Apr. 2001, 7 pages.

* cited by examiner

*Primary Examiner* — Xavier Szewai Wong
(74) *Attorney, Agent, or Firm* — Conley Rose, P.C.; Grant Rodolph; William H. Dietrich

(57) ABSTRACT

An apparatus comprising a path computation element (PCE) associated with a domain in a network and configured to find a segment of a Multiprotocol Label Switching (MPLS) Traffic Engineering (TE) Label Switched Path (LSP) that crosses a plurality of domains in the network using a Constraint Shortest Path First (CSPF) algorithm or a reverse CSPF algorithm that computes a plurality of shortest paths in the domain of which the segment is selected, wherein the CSPF algorithm or the reverse CSPF algorithm is selected to reduce the number of shortest path computations in the domain based on the number of starting nodes and ending nodes that are considered for computing the shortest paths in the domain.

20 Claims, 6 Drawing Sheets

SYSTEM AND METHOD FOR FINDING SEGMENTS OF PATH FOR LABEL SWITCHED PATH CROSSING MULTIPLE DOMAINS

CROSS-REFERENCE TO RELATED APPLICATIONS

Not Applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a point-to-point (P2P) path, which comprises a plurality of nodes and/or Label Switch Routers (LSRs) and extends from a source node or LSR to a destination node or LSR. The P2P path can also cross a plurality of domains, where a domain is a collection of network elements within a common sphere of address management or path computational responsibility, such as an Interior Gateway Protocol (IGP) area or an Autonomous Systems. Alternatively, the path can be a Point-to-Multipoint (P2MP) path that extends from the source node to a plurality of destination nodes across multiple domains.

SUMMARY

In one embodiment, the disclosure includes an apparatus comprising a PCE associated with a domain in a network and configured to find a segment of a MPLS TE LSP that crosses a plurality of domains in the network using a Constraint Shortest Path First (CSPF) algorithm or a reverse CSPF algorithm that computes a plurality of shortest paths in the domain of which the segment is selected, wherein the CSPF algorithm or the reverse CSPF algorithm is selected to reduce the number of shortest path computations in the domain based on the number of starting nodes and ending nodes that are considered for computing the shortest paths in the domain.

In another embodiment, the disclosure includes a network component comprising a receiver configured to receive a request message from a source for computing a TE path from the source node to a destination node across a plurality of domains in a network, a logic unit configured to obtain the TE path by combining a plurality of segments from the corresponding domains that are computed using a 1-to-n reverse CSPF algorithm if the number of starting nodes is greater than the number of ending nodes in the corresponding domains or otherwise using a 1-to-n normal CSPF algorithm, and a transmitter configured to send a reply message the source node comprising information about the TE path and the segments.

In a third aspect, the disclosure includes a method implemented by one or more network components comprising computing a plurality of paths in each of a plurality of network domains using a reverse CSPF algorithm comprising a reverse CSPF-Dijkstra algorithm and a CSPF-A* algorithm or using a normal CSPF algorithm comprising a CSPF-Dijkstra algorithm and a reverse CSPF-A* algorithm based on the number of starting and ending nodes for the paths in each domain, and selecting a segment in each of the domains from the calculated paths in each domain to obtain a shortest path across the domains.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet Engineering Task Force (IETF) request for comment (RFC) 5441 entitled "A Backward Recursive PCE-based Computation (BRPC) procedure to compute shortest inter-domain Traffic Engineering Label Switched Paths", which is published in http://ietfreportisoc.org/rfc/rfc5441.txt and incorporated herein by reference, describes a procedure relying on the use of multiple PCEs to compute a MPLS TE P2P LSP shortest path across a predetermined sequence of domains, using a backward-recursive path computation technique. The IETF draft entitled "PCE-based Computation Procedure To Compute Shortest Constrained P2MP Inter-domain Traffic Engineering Label Switched Paths", which is published in http://tools.ietf.org/id/draft-zhao-pce-pcep-inter-domain-p2mp-procedures-07.txt and incorporated herein by reference, describes a procedure relying on the use of multiple PCEs to compute a MPLS TE P2MP LSP path across a plurality of domains. However, the IETF RFC 5441 and the IETF draft above do not specify any improved faster algorithm, e.g., CSPF algorithm, for finding a segment of a path in a domain for a MPLS TE LSP crossing a plurality of domains.

The documents above also do not specify any way in which a segment of a path in a domain for a MPLS TE LSP crossing a plurality of domains is computed with improved efficiency.

Disclosed herein is a system and methods for finding a segment of a path in a domain for a MPLS TE LSP, which may be a P2P or P2MP path, crossing a plurality of domains. The segment may be obtained in a PCE environment using an improved algorithm in terms of computation efficiency and speed. The algorithm may be used to compute a plurality of paths in each domain, from which a segment for the MPLS TE LSP may be selected. Specifically, a 1-to-n reverse CSPF algorithm or a 1-to-n normal CSPF algorithm may be used, based on the number of source or first boundary nodes and destination or second boundary nodes in each domain. The 1-to-n reverse CSPF algorithm may be implemented using a reverse CSPF-Dijkstra algorithm and a CSPF-A* algorithm. The 1-to-n normal CSPF algorithm may be implemented using a CSPF-Dijkstra algorithm and a reverse CSPF-A* algorithm. The algorithms used herein are described in detail further below.

Figure 1:
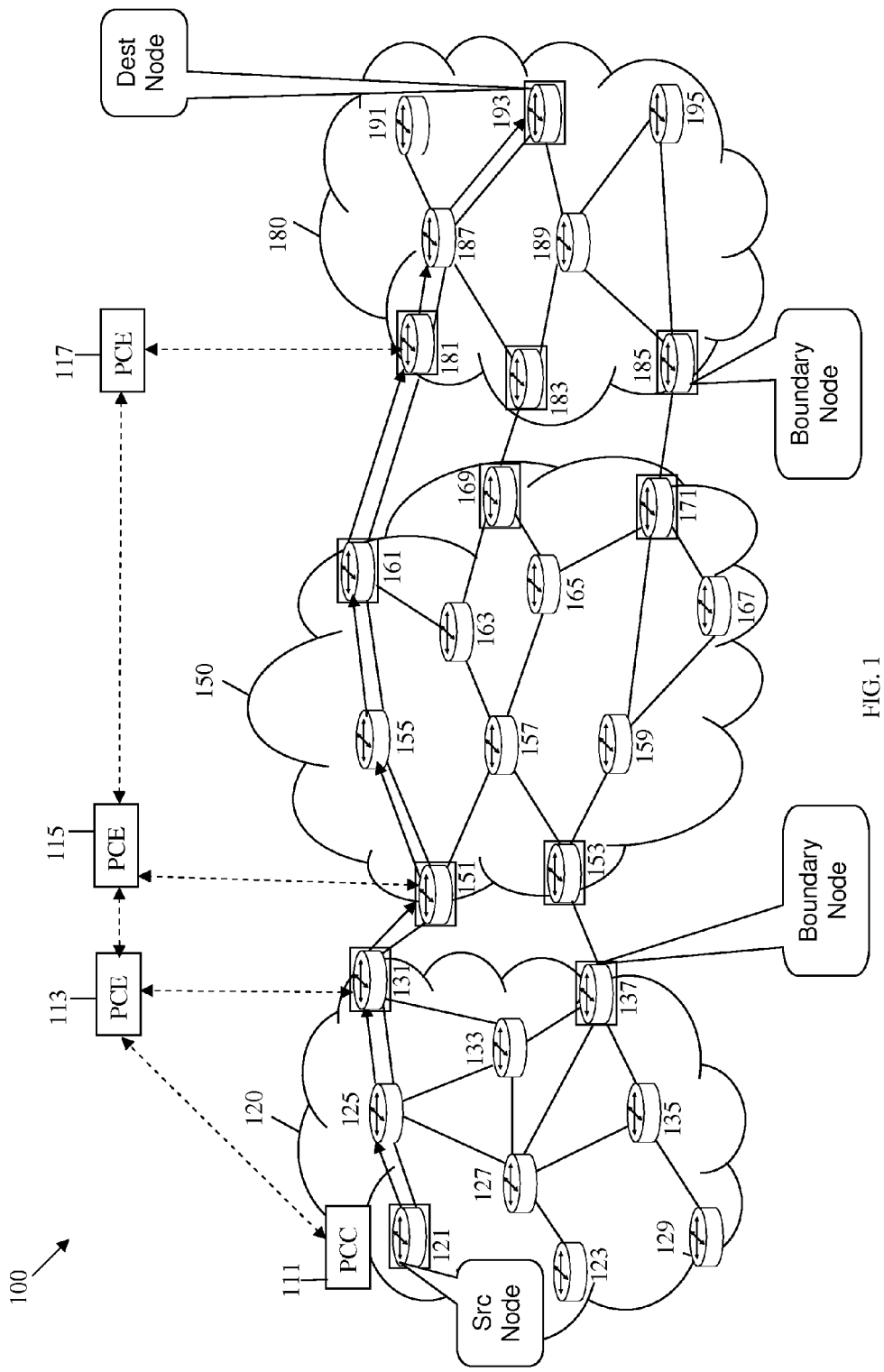
FIG. 1 is a schematic diagram of an embodiment of a label switched system.

FIG. 1 illustrates one embodiment of a label switched system 100, where one or more MPLS TE LSPs may be established between at least some of the components crossing a plurality of domains. The MPLS TE LSPs may comprise a P2P path, a P2MP path, or both. The LSP(s) may be used to transport data traffic. The label switched system 100 may comprise a plurality of domains 120, 150 and 180, which may each comprise a plurality of boundary nodes and intermediate nodes. A path for a MPLS TE LSP may be established across the domains 120, 150, 180, e.g., from a source node to a destination node. For instance, a path may be established from a source node 121 to a destination node 193 along the nodes 125, 131, 151, 155, 161, 181, and 187 across the domains 120, 150, and 180. The packets may be routed or switched along the path, which may be established by a label switching protocol, such as MPLS or GMPLS.

Each domain of the label switched system 100 may comprise a plurality of boundary nodes and internal nodes. A boundary node of a domain may connect directly to a boundary node of another domain. For instance, the nodes 131 and 137 are boundary nodes of domain 120 of the label switched system 100, where node 131 of domain 120 may connect directly to node 151 of domain 150 and node 137 of domain 120 may connect directly to node 153 of domain 150. The nodes 151, 153, 161, 169, and 171 are boundary nodes of domain 150, where nodes 161, 169, and 171 of domain 150 may connect directly to nodes 181, 183, and 185 of domain 180, respectively. Similarly, the nodes 181, 183, and 185 are boundary nodes of domain 180.

The boundary nodes and internal nodes (in the domains 120, 150, and 180) may be any devices or components that support transportation of the packets through the label switched system 100. For example, the nodes may include switches, routers, or various combinations of such devices. The nodes may receive packets from other network nodes, comprise logic circuitry that determines which nodes to send the packets to, and transmit the packets to the other nodes. In some embodiments, at least some of the nodes may be label switched routers (LSRs), which may be configured to modify or update the labels of the packets transported in the label switched system 100. Further, at least some of nodes may be label edge routers (LERs), which may be configured to insert or remove the labels of the packets transported between the label switched system 100 and an external network (not shown here).

Additionally, each of the domains 120, 150, and 180 may have at least a PCE, which may be responsible for computing a segment of a path for a MPLS TE LSP crossing the domains 120, 150, and 180. The segment may be computed based on network topology information and path computation constraints. For instance, the domain 120 may have a PCE 113, which may be associated with a boundary node 131 of the domain 120. The domain 150 may have a PCE 115, which may be associated with a boundary node 151 of domain 150. The domain 180 may have a PCE 117, which may be associated with a boundary node 181 of domain 180. A source node of the MPLS TE LSP may also be associated with a PCC in the label switched system 100. For instance, a source node 121 of the MPLS TE LSP may be associated with a PCC 111. As such, when the source node 121 requires a shortest path for the MPLS TE LSP, the source node 121 may send a request message to the PCE 113 via the PCC 111 to ask for computing the shortest path for the MPLS TE LSP from source node 121 to a destination node 193. To find the path, the PCE 113 responsible for domain 120 may collaborate with the PCEs 115 and 117 responsible for domain 150 and 180, respectively. After the path is found, the PCE 113 may send the path information to the PCC 111 in a reply message, which may then inform the source node 121 of the computed path (indicated by the arrows in FIG. 1). The path may then be established accordingly for source node 121 to destination node 193. In another embodiment, one of the PCEs may obtain the path information and constraints from the other PCEs and perform the computations to obtain the segments and hence the path for the MPLS TE LSP.

Typically, when a BRPC procedure is used to compute a shortest path for a MPLS TE P2P LSP crossing the domains 120, 150, and 180, e.g., as described in RFC 5441, a number of paths may be computed for each of the domains 120, 150, and 180. For instance, for a MPLS TE P2P LSP from the source node 121 to the destination node 193, a plurality of path segments in domain 180, a plurality of path segments in domain 150, and then a plurality of path segments in domain 120 may be computed in that order. In the domain 180 comprising the destination node 193 of the MPLS TE P2P LSP, the BRPC procedure may compute the shortest paths from each boundary node of domain 180 to the destination node 193. Specifically, the BRPC procedure may compute the shortest path from the boundary node 181 to the destination node 193, the shortest path from the boundary node 183 to the destination node 193, and the shortest path from the boundary node 185 to the destination node 193.

Further, in the domain 150, the BRPC procedure may compute the shortest paths to each of the boundary nodes 161, 169, and 171 (that are connected to domain 180) from all the other boundary nodes. Specifically, the BRCP procedure may compute the shortest paths from the boundary nodes 151 and 153 to the boundary node 161, the shortest paths from the boundary nodes 151 and 153 to the boundary node 169, and the shortest paths from the boundary nodes 151 and 153 to the boundary node 171. In the domain 120 comprising the source node 121 of the MPLS TE P2P LSP, the BRPC procedure may compute the shortest paths from the source node 121 to each boundary node of domain 120. Specifically, the shortest path from the source node 121 to the boundary node 131 and the shortest path from the source node 121 to the boundary node 137 may be computed.

After obtaining all the shortest paths in each of the domains 120, 150, and 180, a total shortest path from the source node 121 to the destination node 193 may be selected for the MPLS TE P2P LSP. The total number of shortest paths computed in each domain using the BRCP procedure may be substantially large and may reduce the efficiency and speed of computation. The computation efficiency and speed may be further reduced if the number of boundary nodes in the domains is further increased. Thus, an improved procedure may be needed instead to find a segment of the MPLS TE LSP in each of the domains 120, 150, and 180 with improved efficiency and speed.

Specifically, in the case of a domain comprising the destination node of a MPLS TE LSP (e.g., domain 180 that comprises destination node 193), a PCE associated with the domain (e.g., PCE 117) may compute the shortest paths from all the boundary nodes of the domain to the destination node using a 1-to-n reverse CSPF algorithm described below (n is an integer and equal to a quantity of paths). The 1-to-n reverse CSPF algorithm may consider the destination node of the MPLS TE LSP as a destination node and the boundary nodes of the domain as source nodes.

Alternatively, in the case of a domain comprising a plurality of destination nodes for a plurality of MPLS TE LSPs (e.g., for a P2MP path scenario), a PCE responsible for the domain may compute the shortest paths from each of the boundary nodes of the domain to all the destination nodes using the 1-to-n normal CSPF algorithm. In this case, the number of destination nodes in the domain may be greater than the number of boundary nodes of the domain. The 1-to-n normal CSPF algorithm may consider each boundary node as a source node and all the destination nodes of the MPLS TE LSPs as destination nodes.

Additionally, in the case of a domain comprising the source node of the MPLS TE LSP (e.g., domain 120 that comprises source 121), a PCE responsible for the domain may compute the shortest paths from the source node to all the boundary nodes of the domain using a 1-to-n normal CSPF algorithm described below. The 1-to-n normal CSPF algorithm may consider the source node of the MPLS TE LSP as a source node and the boundary nodes of the domain as destination nodes.

Alternatively, in the case of a domain comprising a plurality of source nodes of a plurality of MPLS TE LSPs, a PCE responsible for the domain may compute the shortest paths from all the source nodes to each of the boundary nodes of the domain using the 1-to-n reverse CSPF algorithm. In this case, the number of source nodes in the domain may be greater than the number of boundary nodes of the domain. The 1-to-n reverse CSPF algorithm may consider each boundary node as a destination node and all the source nodes of the MPLS TE LSPs as source nodes.

Further, in the case of a domain comprising a first set of boundary nodes as possible intermediate destination nodes of a plurality of MPLS TE LSPs and a second set of boundary nodes as possible intermediate source nodes of the MPLS TE LSPs, a PCE responsible for the domain may compute the shortest paths from each of the possible intermediate source nodes to all the possible intermediate destination nodes using the 1-to-n normal CSPF algorithm if the number of the possible intermediate destination nodes is greater than the number of the possible intermediate source nodes (e.g., as in the case of the domain 150 comprising a first set of boundary nodes 161, 169 and 171 as possible intermediate destination nodes and a second set of boundary nodes 151 and 153 as possible intermediate source nodes of a plurality of MPLS TE LSPs). The 1-to-n normal CSPF algorithm may consider each possible intermediate source node of the MPLS TE LSP as a source node and all the possible intermediate destination nodes as destination nodes.

Alternatively, in the case of a domain comprising a first set of boundary nodes as possible intermediate destination nodes of a plurality of MPLS TE LSPs and a second set of boundary nodes as possible intermediate source nodes of the MPLS TE LSPs, a PCE responsible for the domain may compute the shortest paths from all the possible intermediate source nodes to each of the possible intermediate destination nodes using the 1-to-n reverse CSPF algorithm if the number of the possible intermediate source nodes is greater than the number of the possible intermediate destination nodes. The 1-to-n reverse CSPF algorithm may consider each possible intermediate destination node of a MPLS TE LSP as a destination node and all the possible intermediate source nodes as source nodes.

The cases above may be based on using the 1-to-n reverse CSPF algorithm or the 1-to-n normal CSPF algorithm. Specifically, the 1-to-n reverse CSPF algorithm may be based on implementing two algorithms: a reverse CSPF-Dijkstra algorithm and a CSPF-A* algorithm, both of which are described in detail below. The 1-to-n normal CSPF algorithm may also be based on implementing two algorithms: a CSPF-Dijkstra algorithm and a reverse CSPF-A* algorithm, both of which are also described in detail below.

The algorithms above may be based on a Dijkstra algorithm or an A* algorithm. The Dijkstra algorithm may be typically used for finding a shortest path between two nodes in a network. To calculate shortest paths that satisfy a set of constraints, the Dijkstra algorithm may be modified in such a way that during the course of path calculation the algorithm prunes those links and/or nodes that violate any of the constraints. For example, constraints may comprise a minimum bandwidth required per link, a maximum number of links traversed, include/exclude nodes, and/or other constraints. A Dijkstra algorithm that satisfies a set of constraints is referred to herein as a CSPF-Dijkstra algorithm.

The CSPF-Dijkstra algorithm may use the following data structures: OPEN, which is a set of Open Nodes, and CLOSED, which is a set of Closed Nodes. The CSPF-Dijkstra algorithm may comprise the following steps:
1. Start from a source node, put it into CLOSED and set its cost to zero;
2. For node R just inserted into CLOSED, find all its next-hop nodes N, for each N do:
    a) If N is in CLOSED, ignore N;
    b) Calculate the Cost $g(N)=g(R)+\text{metric }(R \rightarrow N)$;
    c) If $g(N)$ is greater than a previously calculated cost for N, ignore N;
    d) If N or link from R to N violates any constraints, discard N;
    e) Insert N into OPEN;
3. Find the node in OPEN with the smallest cost, delete it from OPEN and insert it into CLOSED;
4. Repeat step 2 and 3 until the destination is reached or OPEN is empty.

In the above steps, node N is a next hop of node R if there is a link from node R to node N. The metric$(R \rightarrow N)$ is the metric or cost of the link from node R to node N. The metric$(R \rightarrow N)$ may be different from metric$(N \rightarrow R)$.

The reverse CSPF-Dijkstra algorithm may use the following data structures: OPEN, which is a set of Open Nodes; and CLOSED, which is a set of Closed Nodes. The reverse CSPF-Dijkstra algorithm may comprise the following steps:
1. Start from the destination node, put it into CLOSED and set its cost to zero;
2. For node R just inserted into CLOSED, find all its previous-hop nodes N, for each N do:
    a) If N is in CLOSED, ignore N;
    b) Calculate the Cost $g(N)=g(R)+\text{metric }(N \rightarrow R)$;
    c) If $g(N)$ is greater than a previously calculated cost for N, ignore N;

d) If N or link from N to R violates any constraints, discard N;
e) Insert N into OPEN;
3. Find the node in OPEN with the smallest cost, delete it from OPEN and insert it into CLOSED;
4. Repeat step 2 and 3 until the source is reached or OPEN is empty.

In the above steps, node N is a previous hop of node R if there is a link from node N to node R. The metric(N→R) is the metric or cost of the link from node N to node R. The metric (N→R) may be different from metric(R→N).

The A* algorithm may be another heuristic search algorithm that may be used to find the shortest path between two nodes. The A* algorithm may be more efficient than the Dijkstra algorithm if proper or "good" heuristic knowledge is used. Specifically, in the step 3 above of the Dijkstra algorithm, the A* algorithm may find the node in OPEN with the smallest value of f(N) instead of the node in OPEN with the smallest cost. The value of f(N) may be about equal to a sum of g(N) and h(N), i.e. f(N)=g(N)+h(N), where g(N) is the same as in the Dijkstra algorithm, which may be equal to the actual cost from the source node to node N. The value of h(N) may be an evaluation of the cost from node N to the destination node, which is referred to as heuristic function or heuristic information.

An A* algorithm that satisfies a set of constraints is referred to herein as a CSPF-A* algorithm. The CSPF-A* algorithm may use the following data structures: OPEN, which is a set of Open Nodes; and CLOSED, which is a set of Closed Nodes. The CSPF-A* algorithm may comprise the following steps:
1. Start from the source node, put it into CLOSED and set its cost to zero;
2. For node R just inserted into CLOSED, find all its next-hop nodes N, for each node N do:
   a) If N is in CLOSED, ignore N;
   b) Calculate the cost g(N)=g(R)+metric (R→N);
   c) If g(N) is greater than a previously calculated cost for N, ignore N;
   d) If N or link from N to R violates any constraints, discard N;
   e) Calculate the heuristic cost f(N)=g(N)+h(N);
   f) Insert N into OPEN;
3. Find the node C in OPEN with the smallest f(C), delete C from OPEN and Insert C into CLOSED;
4. Repeat steps 2 and 3 until the destination node is reached or OPEN is empty.

In the above steps, node N is a next hop of node R if there is a link from node R to node N. The metric(R→N) is the metric or cost of the link from node R to node N. The metric(R→N) may be different from metric (N→R).

For the CSPF-A* algorithm, the following conclusions may be made:
   When h(N) is smaller than the actual cost from node N to the destination node, the CSPF-A* algorithm may find the shortest path.
   When h(N) is equal to the actual cost from node N to the destination node, the CSPF-A* algorithm may search along the same path as that the CSPF-Dijkstra algorithm traverses.
   When h(N) is greater than the actual cost from node N to the destination node, the CSPF-A* algorithm may find a path which is not the shortest one.

The reverse CSPF-A* algorithm may use the following data structures: OPEN, which is a set of Open Nodes; and CLOSED, which is a set of Closed Nodes. The reverse CSPF-A* algorithm may comprise the following steps:
1. Start from the destination node, put it into CLOSED and set its cost to zero;
2. For node R just inserted into CLOSED, find all its previous-hop nodes N, for each node N do:
   a) If N is in CLOSED, ignore N;
   b) Calculate the cost g(N)=g(R)+metric (N→R);
   c) If g(N) is greater than a previously calculated cost for N, ignore N;
   d) If N or link from N to R violates any constraints, discard N;
   e) Calculate the heuristic cost f(N)=g(N)+h(N);
   f) Insert N into OPEN;
3. Find the node C in OPEN with the smallest f(C), delete C from OPEN and insert C into CLOSED;
4. Repeat steps 2 and 3 until the source node is reached or OPEN is empty.

In the above steps, node N is a previous hop of node R if there is a link from node N to node R. The metric(N→R) is the metric or cost of the link from node N to node R. The metric (N→R) may be different from metric(R→N).

For the reverse CSPF-A* algorithm, the following conclusions may be made:
   When h(N) is smaller than the actual cost from the source node to node N, the reverse CSPF-A* algorithm may find the shortest path.
   When h(N) is equal to the actual cost from the source node to node N, the reverse CSPF-A* algorithm may search along the same path as that the reverse CSPF-Dijkstra algorithm traverses.
   When h(N) is greater than the actual cost from the source node to node N, the reverse CSPF-A* algorithm may find a path which is not the shortest one.

In one scenario, when the reverse CSPF-Dijkstra algorithm finishes computing a shortest path from a source node S to a destination node D, each node M in CLOSED may have an associated cost g(M) from M to D. Thus, if the CSPF-A* Algorithm is used to calculate a path from another source node to D, g(M) may be a suitable heuristic value for M because it may be equal to the actual cost from M to D. Based on this scenario, the 1-to-n reverse CSPF algorithm may be used for computing n shortest paths from n source nodes to a same destination node D. The 1-to-n reverse CSPF algorithm may use for each source node S a record for the cost from S to the destination node D. The 1-to-n reverse CSPF algorithm may comprise the following steps:
1. Use a reverse CSPF-Dijkstra algorithm to calculate first k paths from k source nodes S (k is an integer that is less than or equal to about n) to a destination node D until the number of nodes with costs calculated to the total number of nodes is more than a given percentage.
2. For the rest (n-k) paths, use a CSPF-A* algorithm to compute the paths from the (n-k) source nodes to the destination node.

The 1-to-n reverse CSPF algorithm may be implemented in several different ways by using different parameters such as k and the percentage of nodes with calculated costs. These two parameters may be configurable. Specifically, the reverse CSPF-Dijkstra algorithm may be used for some tunnels starting from the destination node. For the rest of the tunnels, the CSPF-A* algorithm may be used starting from the source nodes. After having enough knowledge about the network using the reverse CSPF-Dijkstra algorithm, the 1-to-n reverse CSPF algorithm may start from the source nodes to search until the current node (destination node) is reached. The inter-mixed use of the reverse CSPF-Dijkstra algorithm and the CSPF-A* algorithm may effectively and tactically reduce the search space so that the calculations of new tunnels may take substantially less time. The more tunnels the algorithm needs to calculate, the more improved the efficiency of the algorithm becomes.

In another scenario, when the CSPF-Dijkstra algorithm finishes computing a shortest path from a source node S to a destination node D, each node M in CLOSED may have an associated cost g(M) from S to M. Thus, if the reverse CSPF-A* algorithm is used to calculate a path from the source node S to another destination node, g(M) may be a suitable heuristic value for M because it may be equal to the actual cost from S to M. Based on this scenario, the 1-to-n normal CSPF algorithm may be used for computing n shortest paths from a same source node S to n destination nodes.

The 1-to-n normal CSPF algorithm may use for each source node S a record for the cost from S to P. The 1-to-n normal CSPF algorithm may comprise the following steps:
1. Use the CSPF-Dijkstra algorithm to calculate first k paths from a source node S to k destination nodes until the number of nodes with costs calculated to the total number of nodes is more than a given percentage.
2. For the rest (n-k) paths, use the reverse CSPF-A* algorithm to compute the paths from the source node S to (n-k) destination nodes.

The 1-to-n normal CSPF algorithm may be implemented in several different ways by using different parameters such as k and the percentage of nodes with calculated costs. These two parameters may be configurable. Specifically, the CSPF-Dijkstra algorithm may be used for some tunnels starting from the source node. For the rest of the tunnels, the reverse CSPF-A* algorithm may be used starting from the destination nodes. After having enough knowledge about the network using the CSPF-Dijkstra algorithm, the 1-to-n normal CSPF algorithm may start from the destination nodes to search until the current node (source node) is reached. The inter-mixed use of the CSPF-Dijkstra algorithm and the reverse CSPF-A* algorithm may effectively and tactically reduce the search space so that the calculations of new tunnels may take substantially less time. The more tunnels the algorithm needs to calculate, the more improved the efficiency of the algorithm becomes.

Figure 2:
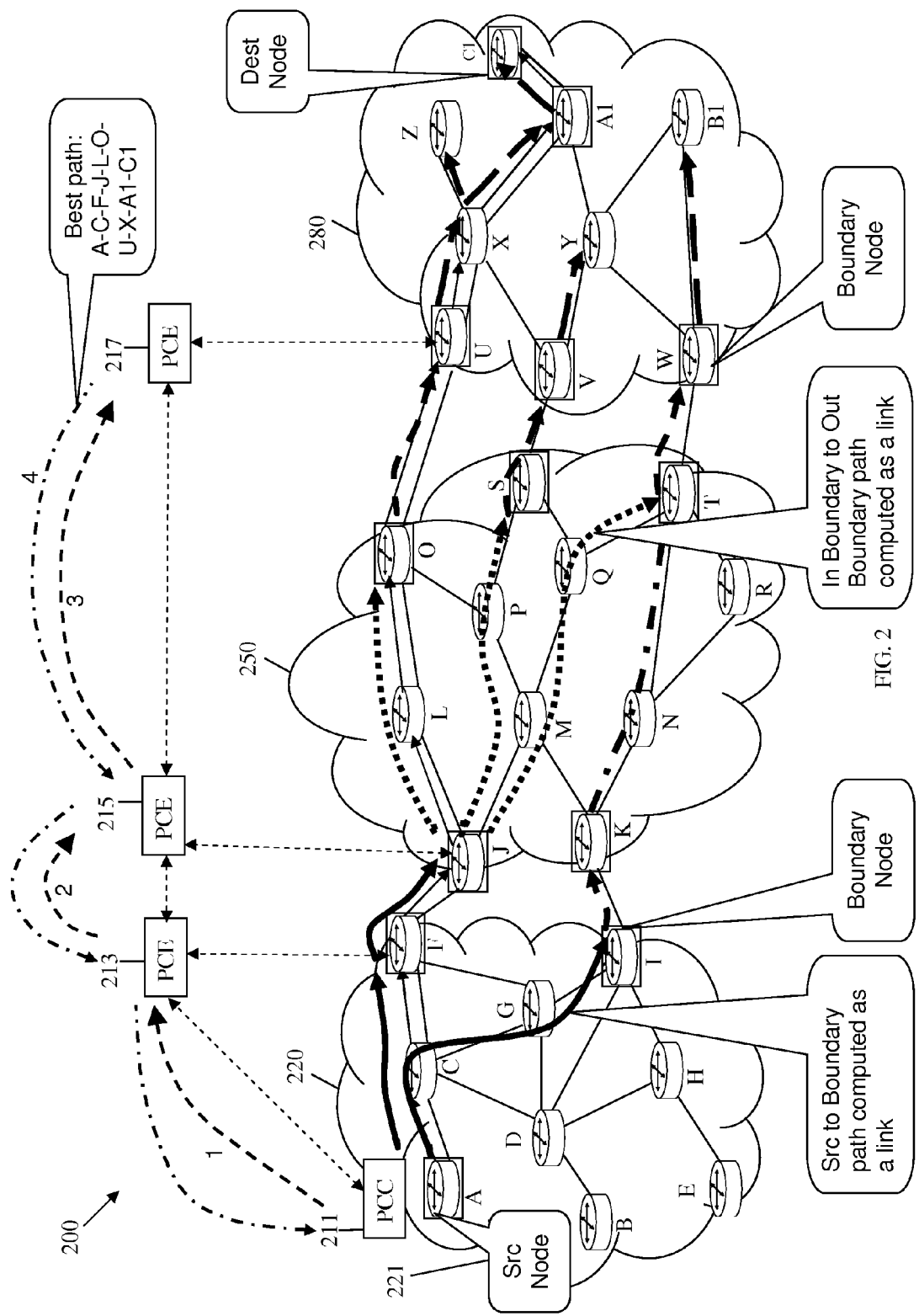
FIG. 2 is a schematic diagram of an embodiment of a path computation scheme across multiple domains.

FIG. 2 illustrates an embodiment of a path computation scheme 200 across multiple domains. The path computation scheme 200 may be used in a label switched system similar to the label switched system 100. A path for a MPLS TE LSP may be established across a plurality of domains 220, 250, and 280 in the label switched system, e.g., from a source node A to a destination node C1. To establish the path from the source node A to the destination node C1 for a MPLS TE LSP across the domains 220, 250, and 280, a segment of the path may be computed in each domain. The segment in each domain may be selected (as a part of the shortest path) from a plurality of computed paths for each domain. The combination of the segments across the multiple domains may form a shortest path from the source node A to the destination node C1. Specifically, the paths in each domain may be computed separately, e.g., using a separate algorithm, e.g., by a PCE associated with the corresponding domain. In some embodiments, multiple segments may be selected in each domain to establish multiple MPLS TE LSPs across the domains, e.g., in the case of a MPLS P2MP LSP.

For instance, the domain 220 may have a PCE 213 (e.g., associated with a boundary node F), the domain 250 may have a PCE 215 (e.g., associated with a boundary node J), and the domain 280 may have a PCE 217 (e.g., associated with a boundary node U). The source node A of the MPLS TE LSP may also be associated with a PCC 211. The source node A may send a request message to the PCE 213 via the PCC 211 to ask for computing the shortest path for the MPLS TE LSP. Thus, the PCE 213 responsible for domain 220 may collaborate with the PCEs 215 and 217 responsible for domain 250 and 280, respectively. After the paths in each domain are computed, e.g., separately by each corresponding PCE for each domain, and the segments of the shortest path are found in each domain, the PCE 213 may send the path information to the PCC 211 in a reply message, which may then inform the source node A of the computed path.

To find a first segment of the path in the domain 220, the PCE 213 may use the 1-to-n normal CSPF algorithm to compute a plurality of shortest paths in domain 220, since the paths in domain 220 are computed from one node to a plurality of nodes, i.e., from the source node A to the boundary nodes F and I. The PCE 215 may also use the 1-to-n normal CSPF algorithm to compute a plurality of shortest paths in domain 250, since the paths in domain 250 are computed from a set of nodes to a larger set of nodes, i.e., from the boundary nodes J and K to the boundary nodes O, S, and T. The PCE 217 may use the 1-to-n reverse CSPF algorithm to compute a plurality of shortest paths in domain 280, since the paths in domain 280 are computed from a plurality of nodes to one node, i.e., from the boundary nodes U, V, and W to the destination node C1. Subsequently, a segment from each of the computed paths in each of the domains may be selected to form a shortest path across the domains from node A to node C1. The segments may be selected by collaboration between the PCE 213, 215, and 217. The resulting path for the MPLS TE LSP may comprise the nodes A, C, F, J, L, O, U, X, A1, and C1.

Figure 3:
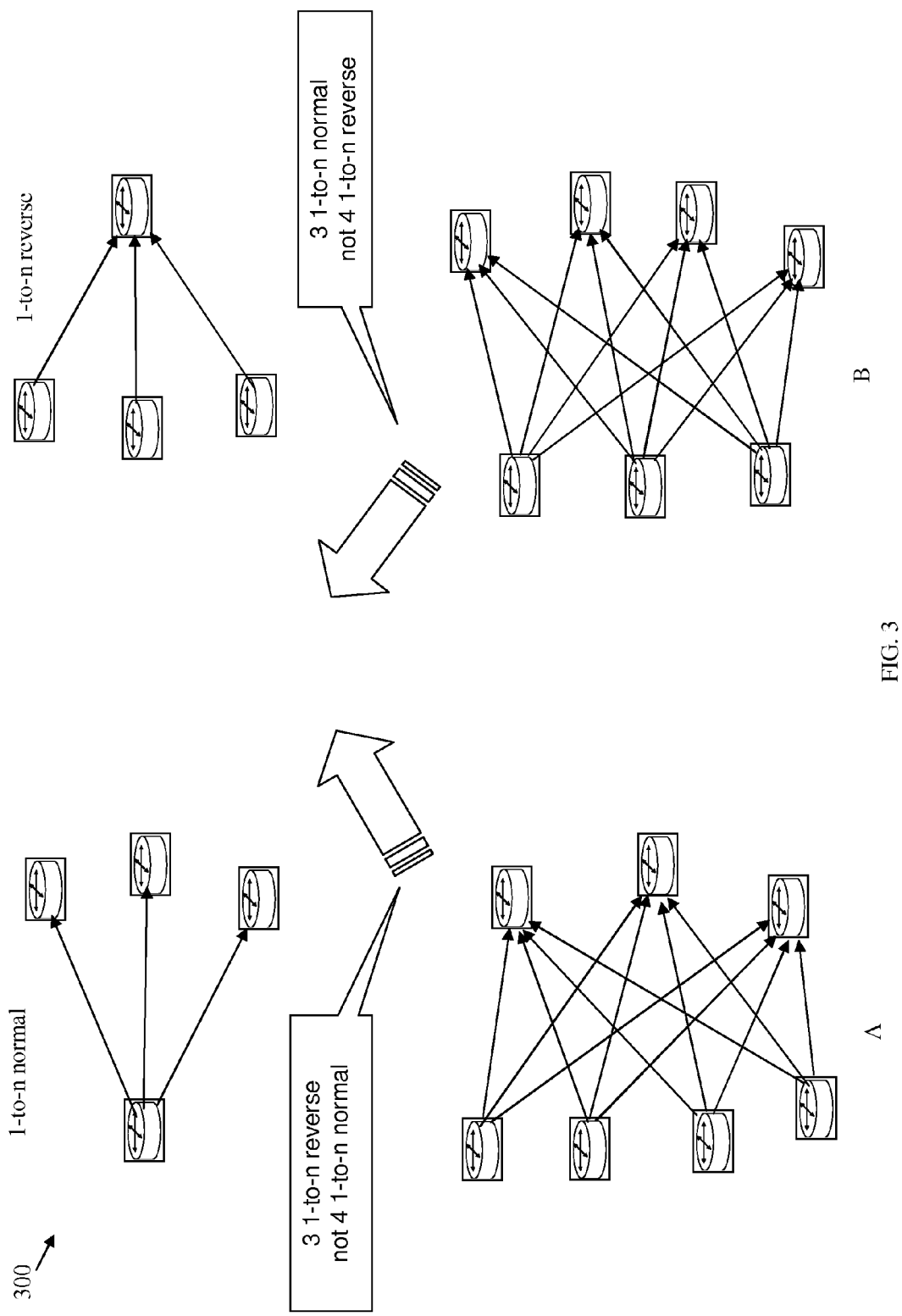
FIG. 3 is a schematic diagram of an embodiment of a path computation algorithm selection scheme.

FIG. 3 illustrates an embodiment of a path computation algorithm selection scheme 300. The selection scheme 300 may be used (e.g., by a PCE) to determine whether to use the 1-to-n reverse CSPF algorithm or the 1-to-n normal CSPF algorithm to compute the shortest paths in each domain. As shown in FIG. 3, there may be two general cases for computing a plurality of paths between the boundary nodes in a domain, between one or more source nodes and boundary nodes, or between boundary nodes and one or more destination nodes.

In a first case, the paths may be computed from a first set of nodes to a smaller second set of nodes in the same domain. For example, in case A, the first set of nodes may comprise four nodes and the second set of nodes may comprise three nodes. If the paths are computed using a 1-to-n normal algorithm, then about four computations may be needed, where each computation may provide a set of 1-to-n (n=3) normal paths from each node of the first set of nodes to all three nodes in the second set of nodes. However, if a 1-to-n reverse algorithm is used instead, then about three computations may be needed, where each computation may provide a set 1-to-n (n=4) reverse paths from each node of the second set of nodes to all four nodes in the first set of nodes. Thus, the 1-to-n reverse algorithm may be more suitable for this first case since it requires fewer computations. This first case may apply for the domain 280 above, where the paths are computed from three boundary nodes U, V, and W to one destination node C1.

In a second case, the paths may be computed from a first set of nodes to a larger second set of nodes in the same domain. For example, in case B, the first set of nodes may comprise three nodes and the second set of nodes may comprise four nodes. If the paths are computed using a 1-to-n normal algorithm, then about three computations may be needed, where each computation may provide a set of 1-to-n (n=4) normal paths from each node of the first set of nodes to all four nodes in the second set of nodes. However, if a 1-to-n reverse algorithm is used instead, then about four computations may be needed, where each computation may provide a set 1-to-n (n=3) reverse paths from each node of the second set of nodes to all three nodes in the first set of nodes. Thus, the 1-to-n normal algorithm may be more suitable for this second case since it requires fewer computations. This second case may apply for the domain 220 above, where the paths are computed from one source node A to two boundary nodes F and I, and for the domain 250 above, where the paths are computed from two boundary nodes J and K to three boundary nodes O, S, and T.

Figure 4:
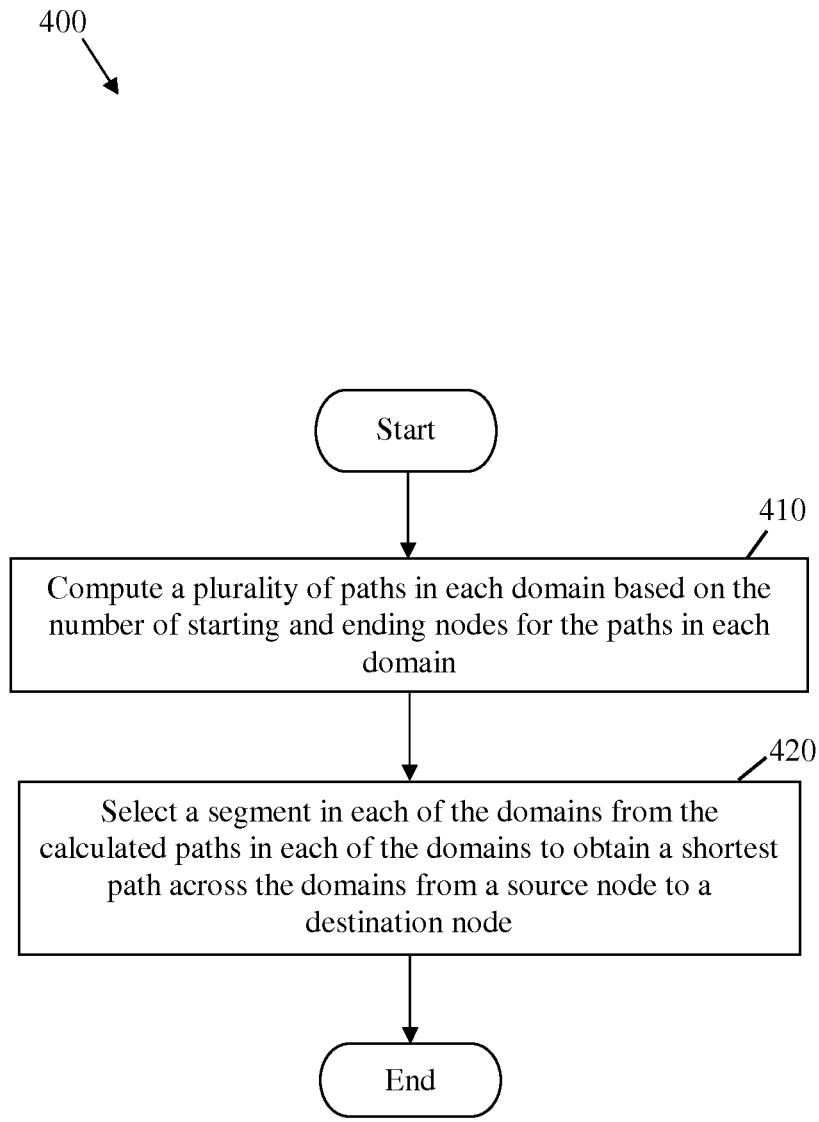
FIG. 4 is a flowchart of an embodiment of a path computation method across multiple domains.

FIG. 4 illustrates an embodiment of a path computation method 400 across multiple domains. The path computation method 400 may be used to find a path for a MPLS TE LSP from a source node to a destination node across multiple domains in a label switched system, as described above. The path may be a shortest path obtained by combining a plurality of segments, each from one of the domains. The segment in each domain may be selected from a plurality of shortest paths computed using the 1-to-n reverse CSPF algorithm or the 1-to-n normal CSPF algorithm, e.g., according to the path computation algorithm selection scheme 300.

The path computation method 400 may begin at block 410, where a plurality of paths may be computed in each domain based on the number of starting and ending nodes for the paths in each domain. The starting nodes may correspond to the source node of the path for the MPLS TE LSP or one or more intermediate boundary nodes in a domain. The ending nodes may correspond to one or more destination nodes (e.g., depending on whether the path for the MPLS TE LSP is a P2P or a P2MP path) or one or more intermediate boundary nodes in a domain. Specifically, the 1-to-n reverse CSPF algorithm may be used if the starting nodes are more than the ending nodes in the domain. Alternatively, the 1-to-n normal CSPF algorithm may be used if the starting nodes are fewer than the ending nodes in the domain. At block 420, a segment may be selected in each of the domains from the calculated paths in each of the domains to obtain a shortest path across the domains from the source node to the destination node. The path computation method 400 may then end.

Figure 5:
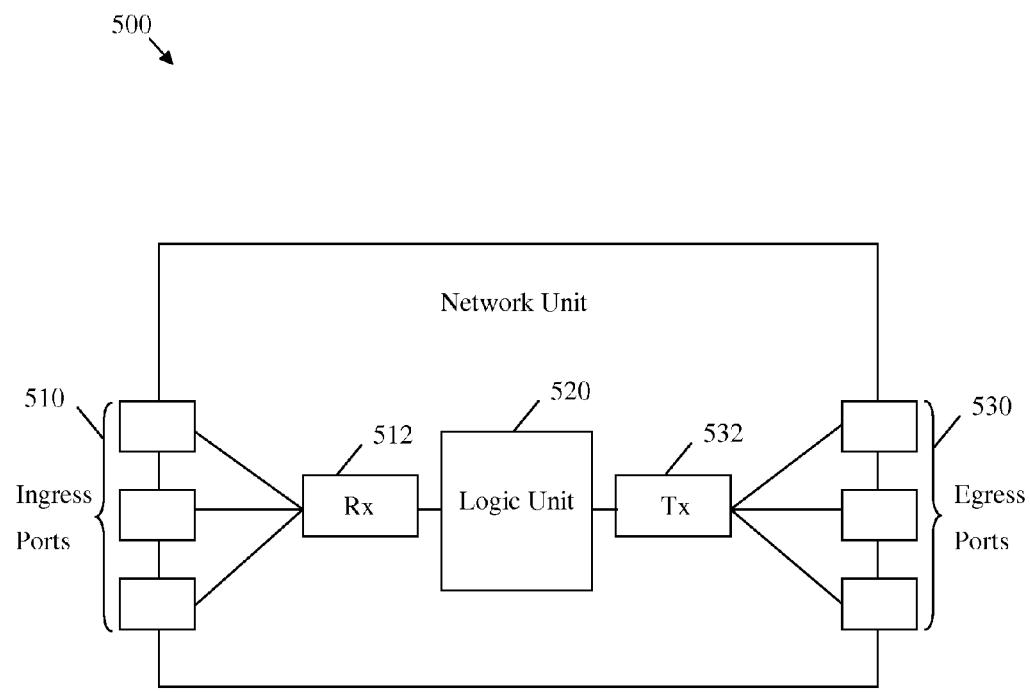
FIG. 5 is a schematic diagram of an embodiment of a network unit.

FIG. 5 illustrates an embodiment of a network unit 500, which may be any device that transports and processes data through a network, e.g., the label switched system 100. For instance, the network unit 500 may be located in any of the network components described above, e.g., the nodes, PCEs, PCCs, or combinations thereof. The network unit 500 may comprise one or more ingress ports or units 510 coupled to a receiver (Rx) 512 for receiving packets, objects, or Type Length Values (TLVs) from other network components. The network unit 500 may comprise a logic unit 520 to determine which network components to send the packets to. The logic unit 520 may also implement the path computation method 400, e.g., based on the path computation algorithm selection scheme 300. The logic unit 520 may be implemented using hardware, software, or both. The network unit 500 may also comprise one or more egress ports or units 530 coupled to a transmitter (Tx) 532 for transmitting frames to the other network components. The components of the network unit 500 may be arranged as shown in FIG. 5.

Figure 6:
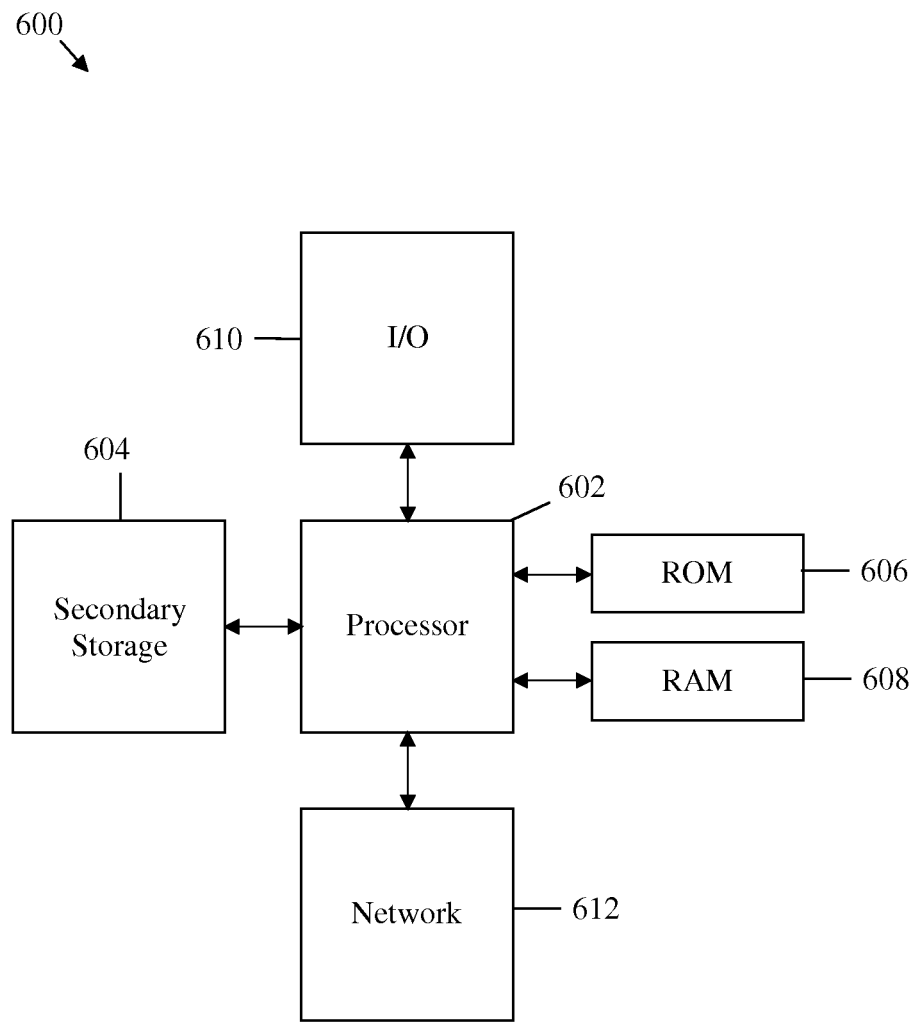
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer program product comprising computer executable instructions stored on a non-transitory computer readable medium that when executed by a processor causes a path computation element (PCE) to perform the following:
    find a segment of a Traffic Engineering (TE) path that crosses a plurality of domains in the network using a Constraint Shortest Path First (CSPF) algorithm or a reverse CSPF algorithm;
    select either the CSPF algorithm or the reverse CSPF algorithm based on a number of starting nodes and a number of ending nodes as a path computation algorithm; and
    compute one or more shortest paths between the starting nodes and the ending nodes using the path computation algorithm.

2. The computer program product of claim 1, wherein the instructions, when executed by the processor, further causes the PCE to communicate with at least one boundary node of the domain and collaborate with one or more other PCEs associated with one or more corresponding domains in the network to find one or more additional segments of the TE path.

3. The computer program product of claim 2, wherein the TE path is established from a source node to a destination node across the domains in the network, and wherein the source node requests from the PCE to compute the TE path.

4. The computer program product claim 3, wherein the request is sent via a Path Computation Client (PCC) that communicates with the source node and the PCE or one of the other PCEs.

5. The computer program product of claim 1, wherein the reverse CSPF algorithm is an one-to-many reverse CSPF algorithm that is used when the number of starting nodes is greater than the number of ending nodes in the domain, and wherein the one-to-many reverse CSPF algorithm comprises a reverse CSPF-Dijkstra algorithm and a CSPF-A* algorithm.

6. The computer program product of claim 1, wherein the CSPF algorithm is an one-to-many CSPF algorithm that is used when the number of starting nodes is less than the number of ending nodes in the domain, and wherein the one-to-many CSPF algorithm comprises a CSPF-Dijkstra algorithm and a reverse CSPF-A* algorithm.

7. The computer program product of claim 6, wherein the CSPF-Dijkstra algorithm comprises determining a cost for next-hop nodes, wherein the reverse CSPF-Dijkstra algorithm comprises determining a cost for previous-hop nodes, wherein the CSPF-A* algorithm comprises determining a cost for next-hop nodes, and wherein the reverse CSPF-A* algorithm comprises determining a cost for previous-hop nodes.

8. The computer program product of claim 1, wherein the PCE is further configured to select the segment from one of the shortest paths, and wherein the starting nodes and the ending nodes are within the domain of which the segment is selected.

9. A network component comprising:
    a receiver configured to receive a request message from a source for computing a Traffic Engineering (TE) path from the source node to a destination node across a plurality of domains in a network;
    a logic unit configured to:
        obtain the TE path by combining a plurality of segments from the corresponding domains;
        select an one-to-many reverse Constraint Shortest Path First (CSPF) algorithm as a path computation algorithm if a number of starting nodes is greater than a number of ending nodes in the corresponding domains;
        select an one-to-many CSPF algorithm as the path computation algorithm if the number of starting nodes is not greater than the number of ending nodes in the corresponding domains; and
        obtain at least one of the segments using the path computation algorithm; and
    a transmitter configured to send a reply message to the source node comprising information about the TE path and the segments.

10. The network component of claim 9, wherein the one-to-many reverse CSPF algorithm comprises using a reverse CSPF-Dijkstra algorithm to calculate first k paths from k source nodes to a destination node D in a domain until the number of nodes with costs calculated to the total number of nodes is more than a given percentage, and using a CSPF-A* algorithm to compute the rest (n-k) paths from the (n-k) source nodes to the destination node in the domain, and wherein n is the number of starting nodes that are source nodes and k is an integer.

11. The network component of clam 10, wherein k and the percentage of nodes with calculated costs is adjusted to combine the reverse CSPF-Dijkstra algorithm and the CSPF-A* algorithm to effectively reduce the path search space and reduce calculations time.

12. The network component of claim 9, wherein the one-to-many CSPF algorithm comprises using a CSPF-Dijkstra algorithm to calculate first k paths from a source node S to k destination nodes in a domain until the number of nodes with costs calculated to the total number of nodes is more than a given percentage and using a reverse CSPF-A* algorithm to compute the rest (n-k) paths from the source node S to (n-k) destination nodes in the domain, and wherein n is the number of starting nodes that are source nodes and k is an integer.

13. The network component of claim 12, wherein k and the percentage of nodes with calculated costs is adjusted to combine the CSPF-Dijkstra algorithm and the reverse CSPF-A* algorithm to effectively reduce the path search space and reduce calculations time.

14. A method for obtaining a path that crosses a plurality of domains, comprising:
    computing, with a processor, a plurality of segments in each of the network domains using a path computation algorithm;
    selecting, with a processor, either an one-to-many reverse Constraint Shortest Path First (CSPF) algorithm or an one-to-many CSPF algorithm as the path computation algorithm based on a number of starting nodes and a number of ending nodes for the segments in each domain; and selecting, with a processor, one of the segments in each of the domains to obtain a shortest path across the domains, wherein the one-to-many reverse CSPF algorithm comprises a reverse CSPF-Dijkstra algorithm and a CSPF-A* algorithm, and wherein the one-to-many CSPF algorithm comprises a CSPF-Dijkstra algorithm and a reverse CSPF-A* algorithm.

15. The method of claim 14, wherein the reverse CSPF-Dijkstra algorithm uses the following data structures: OPEN, which is a set of Open Nodes, and CLOSED, which is a set of Closed Nodes, and wherein the reverse CSPF-Dijkstra algorithm comprises the following steps:

step one, starting from a destination node, put the node into CLOSED and set the node's cost to zero;

step two, for a node R just inserted into CLOSED, find all the node's previous-hop nodes N, and for each node N do:

if node N is in CLOSED, where node N is a previous hop of node R if there is a link from node N to node R, ignore node N;

calculate a Cost $g(N)=g(R)+$metric$(N \rightarrow R)$, where metric $(N \rightarrow R)$ is the metric or cost of the link from node N to node R;

if $g(N)$ is greater than a previously calculated cost for node N, ignore node N;

if node N or a link from node N to node R violates any constraints, discard node N; and insert node N into OPEN;

step three, find the node in OPEN with the smallest cost, delete the node from OPEN, and insert the node into CLOSED; and step four, repeat step two and step three until a source node is reached or OPEN is empty.

16. The method of claim 14, wherein the CSPF-A* algorithm uses the following data structures: OPEN, which is a set of Open Nodes, and CLOSED, which is a set of Closed Nodes, and wherein the CSPF-A* algorithm comprises the following steps:

step one, starting from a source node, put the node into CLOSED and set the node's cost to zero;

step two, for node R just inserted into CLOSED, find all the node's next-hop nodes N, for each node N do:

if node N is in CLOSED, where node N is a next hop of node R if there is a link from node R to node N, ignore node N;

calculate a cost $g(N)=g(R)+$metric $(R \rightarrow N)$, wherein metric$(R \rightarrow N)$ is the metric or cost of the link from node R to node N;

if $g(N)$ is greater than a previously calculated cost for node N, ignore node N;

if node N or a link from node R to node N violates any constraints, discard node N;

calculate a heuristic cost $f(N)=g(N)+h(N)$, wherein $f(N)$ indicates the heuristic cost for node N; and insert node N into OPEN;

step three, find a node C in OPEN with the smallest $f(C)$, delete node C from OPEN, and insert node C into CLOSED, wherein $f(C)$ indicates the heuristic cost for node C; and repeat step two and step three until a destination node is reached or OPEN is empty.

17. The method of claim 16, wherein if $h(N)$ is smaller than an actual cost from node N to the destination node, then the CSPF-A* algorithm finds a shortest path, wherein if $h(N)$ is equal to the actual cost from node N to the destination node, then the CSPF-A* algorithm searches along the same path traversed by the CSPF-Dijkstra algorithm, and wherein if $h(N)$ is greater than the actual cost from node N to the destination node, then the CSPF-A* algorithm finds a path that is not the shortest path.

18. The method of claim 14, wherein the CSPF-Dijkstra algorithm uses the following data structures: OPEN, which is a set of Open Nodes, and CLOSED, which is a set of Closed Nodes, and wherein the CSPF-Dijkstra algorithm comprises the following steps:

step one, starting from a source node, put the node into CLOSED and set the node's cost to zero;

step two, for a node R just inserted into CLOSED, find all the node's next-hop nodes N, and for each node N do:

if node N is in CLOSED, where node N is a next hop of node R if there is a link from node R to node N, ignore node N;

calculate a Cost $g(N)=g(R)+$metric $(R \rightarrow N)$, where metric$(R \rightarrow N)$ is the metric or cost of the link from node R to node N;

if $g(N)$ is greater than a previously calculated cost for node N, ignore node N;

if node N or a link from node R to node N violates any constraints, discard node N; and insert node N into OPEN;

step three, find the node in OPEN with the smallest cost, delete the node from OPEN, and insert the node into CLOSED; and step four, repeat step two and step three until a destination node is reached or OPEN is empty.

19. The method of claim 14, wherein the reverse CSPF-A* algorithm uses the following data structures: OPEN, which is a set of Open Nodes, and CLOSED, which is a set of Closed Nodes, and wherein the reverse CSPF-A* algorithm comprises the following steps:

step one, starting from a destination node, put the node into CLOSED and set the node's cost to zero;

step two, for node R just inserted into CLOSED, find all the node's previous-hop nodes N, for each node N do:

if node N is in CLOSED, where node N is a previous hop of node R if there is a link from node N to node R, ignore node N;

calculate a cost $g(N)=g(R)+$metric $(N \rightarrow R)$, where metric$(N \rightarrow R)$ is the metric or cost of the link from node N to node R;

if $g(N)$ is greater than a previously calculated cost for node N, ignore node N;

if node N or a link from node N to node R violates any constraints, discard node N;

calculate a heuristic cost $f(N)=g(N)+h(N)$, wherein $f(N)$ indicates the heuristic cost for node N; and insert node N into OPEN;

step three, find a node C in OPEN with the smallest $f(C)$, delete node C from OPEN, and insert node C into CLOSED, wherein $f(C)$ indicates the heuristic cost for node C; and step four, repeat step two and step three until a source node is reached or OPEN is empty.

20. The method of claim 19, wherein if $h(N)$ is smaller than an actual cost from the source node to node N, then the reverse CSPF-A* algorithm finds a shortest path, wherein if $h(N)$ is equal to the actual cost from the source node to node N, then the reverse CSPF-A* algorithm searches along the same path traversed by the reverse CSPF-Dijkstra algorithm, and wherein if $h(N)$ is greater than the actual cost from the source node to node N, then the reverse CSPF-A* algorithm finds a path that is not the shortest path.

* * * * *

UNITED STATES PATENT AND TRADEMARK OFFICE
CERTIFICATE OF CORRECTION

| | | Page 1 of 1 |
|---|---|---|
| PATENT NO. | : 8,854,956 B2 | |
| APPLICATION NO. | : 13/195920 | |
| DATED | : October 7, 2014 | |
| INVENTOR(S) | : Huaimo Chen et al. | |

It is certified that error appears in the above-identified patent and that said Letters Patent is hereby corrected as shown below:

In the Claims

Column 14 Line 42 Claim 11 should read:

The network component of claim 10, wherein k and the percentage of nodes with calculated costs is adjusted to combine the reverse CSPF-Dijkstra algorithm and the CSPF-A* algorithm to effectively reduce the path search space and reduce calculations time.

Signed and Sealed this
Sixth Day of January, 2015

Michelle K. Lee
*Deputy Director of the United States Patent and Trademark Office*